United States Patent [19]
Judy

[11] Patent Number: 5,939,633
[45] Date of Patent: Aug. 17, 1999

[54] APPARATUS AND METHOD FOR MULTI-AXIS CAPACITIVE SENSING

[75] Inventor: Michael W. Judy, North Andover, Mass.

[73] Assignee: Analog Devices, Inc., Norwood, Mass.

[21] Appl. No.: 08/878,192

[22] Filed: Jun. 18, 1997

[51] Int. Cl.$^6$ .............................................. G01P 15/125
[52] U.S. Cl. ................. 73/514.32; 73/514.18; 73/862.626
[58] Field of Search ............... 73/514.18, 514.32, 73/514.17, 504.02, 504.04, 504.12, 504.14, 504.15, 862.61, 862.626; 361/280, 283.3

[56] References Cited

U.S. PATENT DOCUMENTS

| | | | |
|---|---|---|---|
| 4,932,259 | 6/1990 | Ueno | 310/329 |
| 4,987,779 | 1/1991 | McBrien | 73/514.18 |
| 5,134,881 | 8/1992 | Henrion et al. | 73/514.18 |
| 5,345,824 | 9/1994 | Sherman et al. | 73/517 |
| 5,440,939 | 8/1995 | Barny et al. | 73/514.18 |
| 5,441,300 | 8/1995 | Yokota et al. | 280/735 |
| 5,487,305 | 1/1996 | Ristic et al. | 73/514.32 |
| 5,511,420 | 4/1996 | Zhao et al. | 73/514.32 |
| 5,748,004 | 5/1998 | Kelly et al. | 73/514.32 |

FOREIGN PATENT DOCUMENTS 195 37 546 A1   4/1997   Germany.

OTHER PUBLICATIONS

Ahmad et al., "A Two–Dimensional Micromachined Accelerometer," *IEEE Transactions on Instrumentation and Measurement*, vol. 46, No. 1, Feb. 1997.

*Primary Examiner*—Hezron Williams
*Assistant Examiner*—Helen C. Kwok
*Attorney, Agent, or Firm*—Hale and Dorr LLP

[57] ABSTRACT

A device for detecting with differential capacitors accelerations in more than one orientation through time-division multiplexing. A micromachined mass is movable along or about any axis in response to a force. The mass forms the common electrode of a set of differential capacitors, wherein the other electrodes of each differential capacitor are fixed. With each differential capacitor, one fixed electrode is set to one voltage and the other fixed electrode is set to a second voltage. The mass is connected to the input of an amplifier and to a switch for connecting the mass to a fixed voltage. The output of the amplifier is coupled to a demodulator for each orientation. A timing circuit activates one demodulator at a time. By toggling the voltages on the fixed electrodes of the differential capacitor corresponding to the active demodulator, the movement of the mass in the orientation corresponding to the active demodulator can be determined.

27 Claims, 4 Drawing Sheets

APPARATUS AND METHOD FOR MULTI-AXIS CAPACITIVE SENSING

FIELD OF THE INVENTION

This invention relates to the field of capacitive sensing circuits and, more particularly, to capacitive circuits for sensing in more than one orientation.

BACKGROUND OF THE INVENTION

Individual sensors are frequently used to measure a force or an acceleration in each of several axes of interest. For example, to measure acceleration along the X- and Y-axes, two sensors are used. One has its sensitive axis along the X-axis and the other has its sensitive axis along the Y-axis.

These sensors can be formed from micromachined silicon structures. In such sensors, a movable mass is positioned between two plates so that one capacitor is formed by one plate and the mass and a second capacitor is formed by the second plate and the mass.

The application of a force along a sensitive axis causes the mass to move relative to the plates, causing a change in the capacitances in the two capacitors of the differential capacitor. This causes a signal to appear on the mass that reflects the amount of acceleration. An accelerometer based on this principle and a process for fabricating such an accelerometer are described in commonly assigned U.S. Pat. Nos. 5,345,824 and 5,314,572, which are incorporated herein by reference.

As the mass in such an accelerometer (or other sensor) forms a single electric node, and is used to output a signal corresponding to the acceleration or force, it has proven difficult to measure acceleration or a force in more than one axis using one movable mass.

The present invention overcomes this and other problems as will be shown in the remainder of the specification referring to the attached drawings.

SUMMARY OF THE INVENTION

A circuit measures the acceleration of or force applied to a device in more than one orientation through the use of time-division multiplexing. This circuit is particularly suited for applications in which full-scale accelerations on the order of 5–10 g's are to be measured. In a preferred embodiment, fingers on a micromachined structure serve as the common electrode for two differential capacitors. The structure (and its fingers) is movable while the other electrodes of the two differential capacitors are fixed. The differential capacitors are positioned along different axes. As a result, if a force is applied to the device, the structure is displaced a distance proportional to the magnitude of the force along each axis. The displacement along a given axis increases the capacitance of one of the capacitors and decreases the capacitance of the other capacitor of the differential capacitor positioned along that axis.

The two fixed electrodes of each differential capacitor are at different voltages. In a preferred embodiment, each capacitor has the same capacitance when no force is applied to the device, the fixed electrodes are at Ground (0 volts) and Vcc (5 volts), and the fingers of the structure are equidistant between the fixed electrodes when no force is applied to the device.

The displacement of the structure in response to a force changes the voltage of the structure. To determine the displacement along an axis, the fixed electrodes of the differential capacitor sensitive to forces on that axis are toggled between the two voltage levels. That is, first the higher voltage is applied to one of the fixed electrodes and the lower voltage is applied to the other fixed electrode, and then the voltages are switched. The resulting voltage on the structure for each setting is amplified and applied to a demodulator. The difference between the two voltages is used to determine the displacement along the axis and therefore the acceleration.

Measurements are taken for each axis. In a preferred embodiment, a separate demodulator is used for the measurements along each axis. Preferably, a reset voltage, midway between the voltages applied to the fixed electrodes, is applied to the structure before measurements are taken for a different axis. The reset voltage forces the structure to that middle voltage. A timing circuit is used to determine when to toggle the voltages on the fixed electrodes, when to apply the reset voltage, and which demodulator registers the voltage on the structure. Many different timing sequences are possible.

DETAILED DESCRIPTION OF PREFERRED EMBODIMENTS

Figure 1:
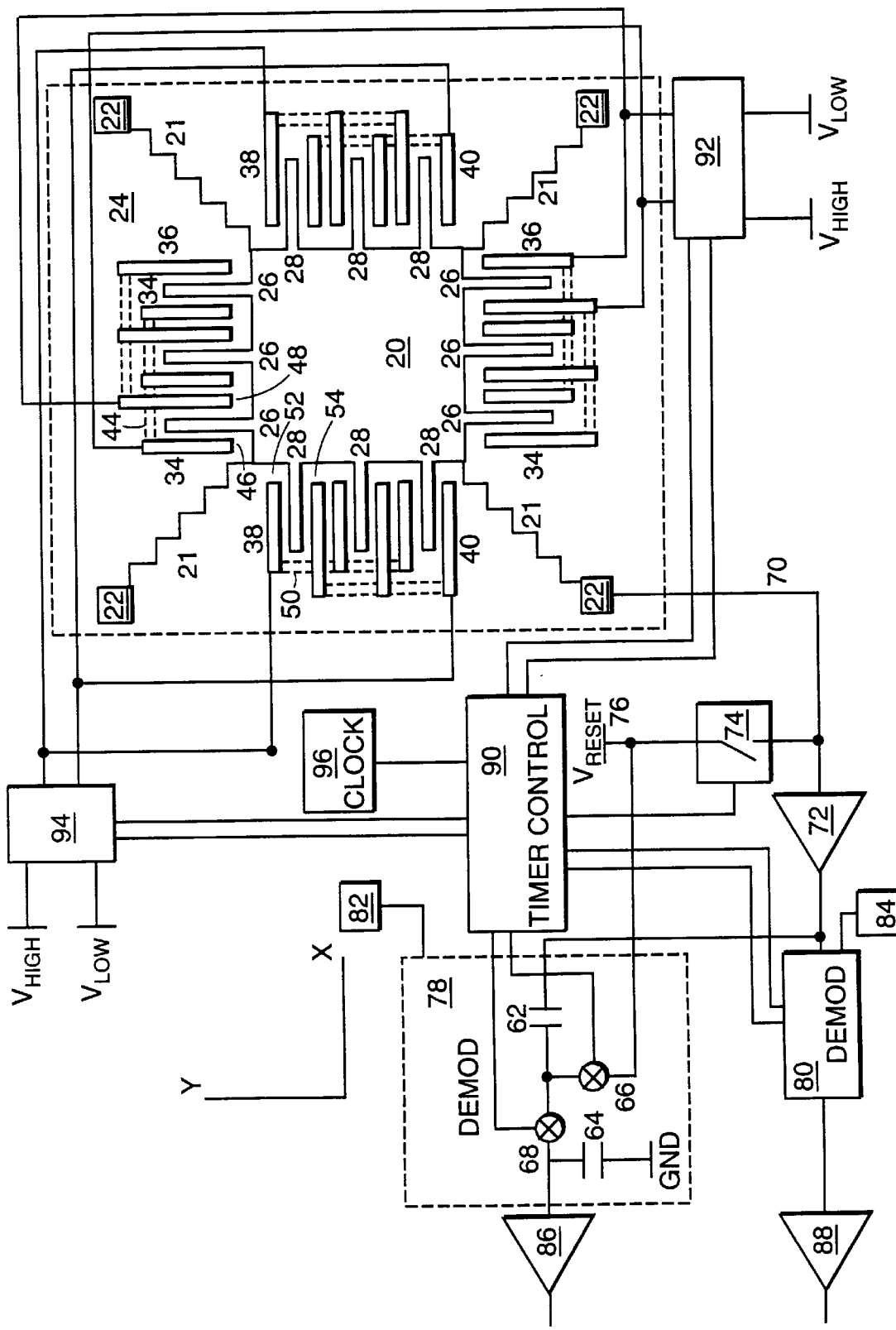
FIG. 1 is a partial block, partial schematic diagram of a first embodiment of the present invention.

With reference to FIG. 1, micromachined mass 20 is suspended by four suspension arms 21 and four anchors 22 above substrate 24. Mass 20 is movable along both the X- and Y-axes relative to substrate 24. It is not necessary that mass 20 respond equally to forces of the same magnitude applied along different axes. Alternatively, mass 20 also could be movable along the Z-axis.

Fingers 26 extend from opposite sides of mass 20, along the Y-axis. Fingers 28 extend from the other two sides of mass 20, along the X-axis. Mass 20, including fingers 26 and 28 and suspension arms 21, is formed from polysilicon and constitutes a single electric node. Anchors 22 also are formed from polysilicon. Preferably, suspension arms 21 are serpentine-shaped.

Polysilicon fingers 34 extend parallel to and to one side of each finger 26. Polysilicon fingers 36 extend parallel to and to the other side of each finger 26. Thus, movement of mass 20 to the right along the X-axis brings each finger 26 closer to its corresponding finger 36 and further from its corresponding finger 34. Fingers 34 are all electrically connected, and fingers 36 are all electrically connected.

Similarly, electrically connected polysilicon fingers 38 extend parallel to and to one side of each finger 28, and electrically connected polysilicon fingers 40 extend on the other side of each finger 28.

Fingers 34, 36, 38, and 40 are stationary relative to substrate 24. Although, for clarity, only three sets of fingers are shown on each side of mass 20, in a preferred embodiment twenty or more sets of fingers are employed on each side of mass 20.

Fingers 26, 34, and 36 form the electrodes of differential capacitor 44, which consists of capacitor 46 (formed from fingers 26 and 34) and capacitor 48 (formed from fingers 26 and 36), so that fingers 26 on mass 20 form the common electrode of differential capacitor 44. Similarly, fingers 28, 38, and 40 form differential capacitor 50, which consists of capacitor 52 (formed from fingers 28 and 38) and capacitor 54 (formed from fingers 28 and 40).

Line 70 connects one of the anchors 22 (as well as fingers 26 and 28, and mass 20) to the input to amplifier 72. Line 70 also connects to switch 74. Preferably, switch 74 is a transistor. When switch 74 is closed, reset voltage 76 is coupled to line 70 and mass 20 through switch 74.

The output of amplifier 72 connects to the input of X-axis demodulator 78 and to the input of Y-axis demodulator 80. X-axis demodulator 78 also has an offset input 82. The output of X-axis demodulator 78 is fed to adjustable buffer amplifier 86. Similarly, Y-axis demodulator 80 has an offset input 84, and its output is fed to buffer amplifier 88. Buffer amplifier 88 is adjustable independent of buffer amplifier 86. The adjustments of buffer amplifiers 86 and 88 can be used to account for sensitivity differences between the X- and Y-axes.

Offset inputs 82 and 84 are used to set the d.c. offset of the demodulators and for offset correction of the sensor. Although a single amplifier 72 is shown, a separate amplifier can be used before each demodulator.

Demodulators 78 and 80 are discrete time demodulators. As shown with respect to demodulator 78, the demodulator can include first capacitor 62, second capacitor 64, first demodulator switch 66, and second demodulator switch 68. The output of amplifier 72 connects to one electrode of first capacitor 62. The other electrode of first capacitor 62 connects to one port of first demodulator switch 66 and one port of second demodulator switch 68. The second port of first demodulator switch 66 connects to reset voltage 76. The second port of second demodulator switch 68 connects to one electrode of second capacitor 64 and to buffer amplifier 86. The other port of second capacitor 64 connects to ground. Alternatively, other discrete time demodulators may be used.

Timer 90 receives clock signals from clock 96, and provides timing signals to reset switch 74, and to control X-axis demodulator 78, Y-axis demodulator 80, and selectors 92 and 94.

Fingers 34 and 36 are connected to first and second outputs of selector 92 and fingers 38 and 40 are connected to first and second outputs of selector 94.

In one embodiment, selectors 92 and 94 each provide a high voltage (Vhigh) on one of the two outputs and a low voltage (Vlow) on the other output. Timer 90 is used to select the voltage (Vhigh or Vlow) to appear on each of the outputs. Preferably, Vhigh is Vcc (e.g., 5 volts) and Vlow is Ground (0 volts). Reset voltage 76 (Vreset) is midway between Vhigh and Vlow.

Mass 20 will be displaced relative to fingers 34 and 36 if a force has been applied to the device that has a component along the X-axis, and will be displaced relative to fingers 38 and 40 if the force has a component along the Y-axis. This displacement of mass 20 will alter the voltage on mass 20, due to the affects of differential capacitors 44 and 50.

Figure 3:
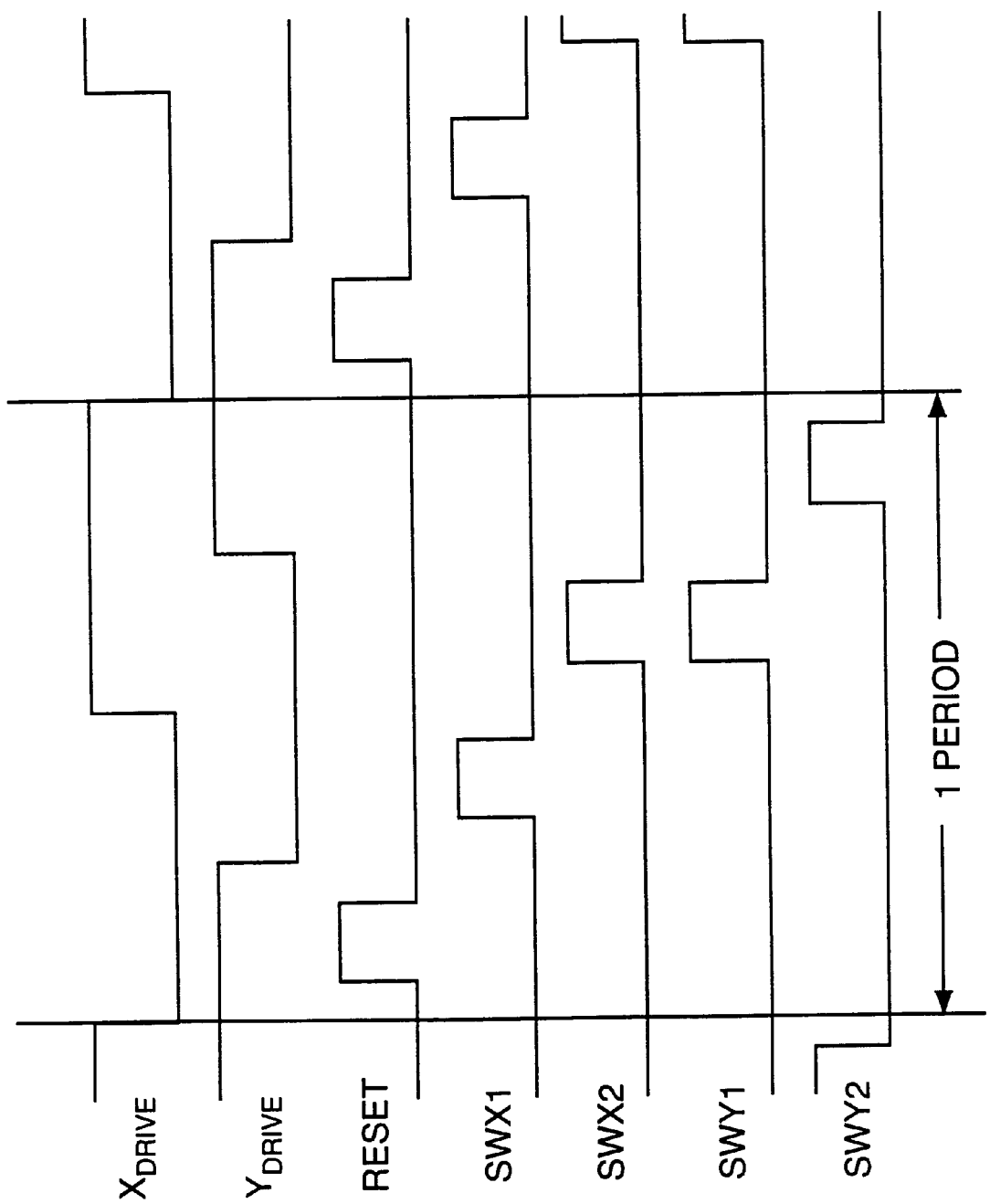
FIG. 3 is a timing diagram illustrating one possible timing sequence for the circuit shown FIG. 1.

A timing sequence used to determine the displacements of mass 20 along the X- and Y-axes for this first embodiment is shown in FIG. 3. Xdrive is the signal (Vhigh or Vlow) that appears at the first output of selector 92, it being understood that if Vhigh appears at the first output then Vlow appears at the second output (and vice versa), and Ydrive is the signal (Vhigh or Vlow) that appears at the first output of selector 94. Xdrive and Ydrive are square waves, with Ydrive 90 degrees out of phase from Xdrive.

At the beginning of a cycle, Xdrive is high and Ydrive is high. Shortly after Xdrive becomes low, a reset pulse is applied to reset switch 74, setting the voltage on mass 20 (and its fingers 26 and 28) to Vreset. By closing the first switch of X-axis demodulator 78 (SWx1) for a period before Xdrive goes high and the second switch of X-axis demodulator 78 (SWx2) for a period after Xdrive goes high, a voltage is obtained at the output of X-axis demodulator 78 that is proportional to the displacement of mass 20 along the X-axis.

While Xdrive is high and Ydrive is low, the first switch of Y-axis demodulator 80 (SWy1) is closed for a period before Ydrive goes high. The second switch of Y-axis demodulator 80 (SWy2) is closed for a period after Ydrive goes high, and a voltage is obtained at the output of Y-axis demodulator 80 that is proportional to the displacement of mass 20 along the Y-axis.

Many other timing sequences can be used, as long as Xdrive switches to the opposite state and Ydrive remains in the same state between the period in which SWx1 is toggled and the period in which SWx2 is toggled; and as long as Ydrive switches to the opposite state and Xdrive remains in the same state between the period in which SWy1 is toggled and the period in which SWy2 is toggled. Preferably, a reset pulse is applied to reset switch 74 after both the X-axis and the Y-axis have been sampled. The reset pulse can be after any integer number of X-axis and Y-axis sampling pairs, or after each X-axis and Y-axis sample.

Figure 4:
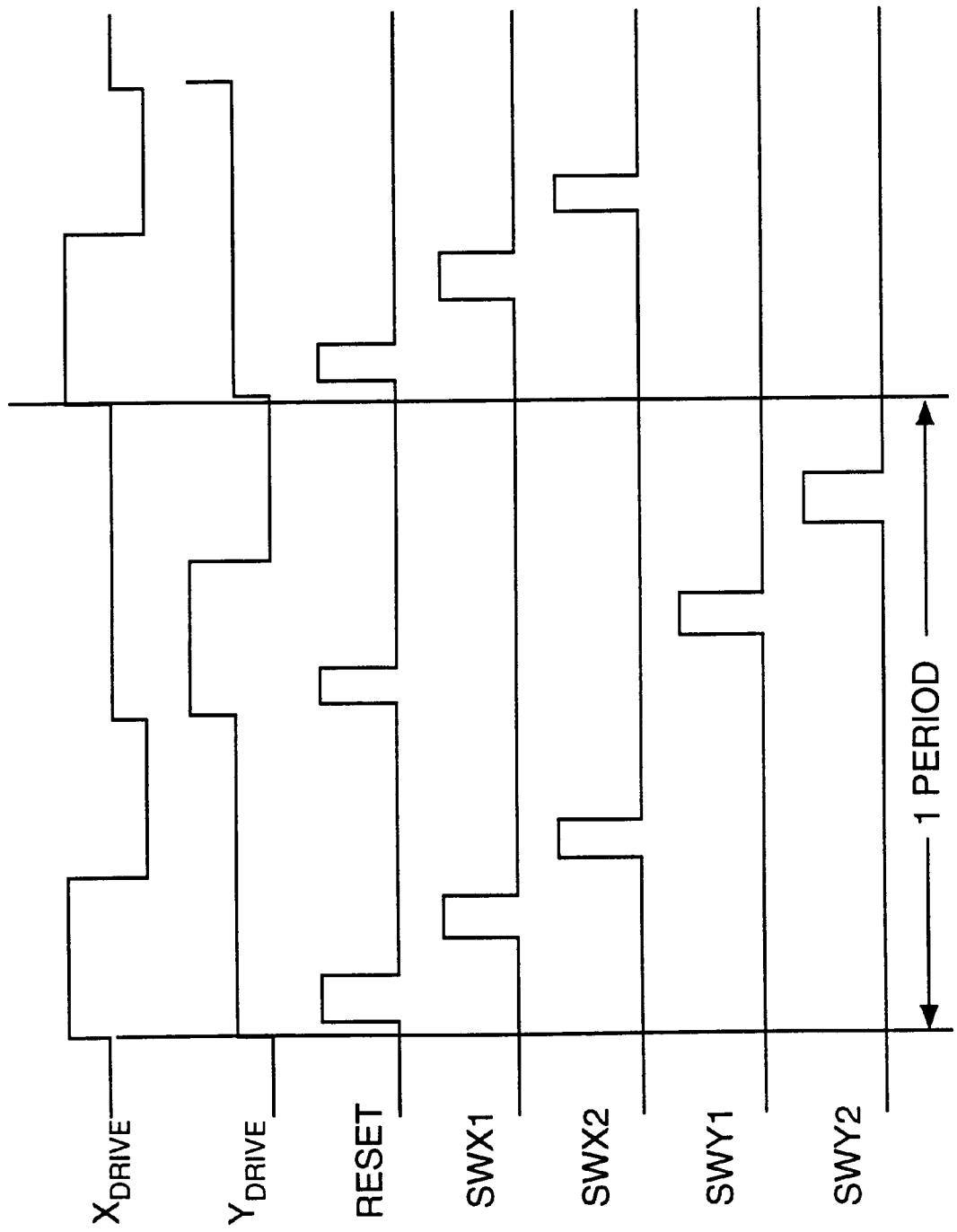
FIG. 4 is a timing diagram illustrating a second possible timing sequence for the circuit shown in FIG. 1.

In a second embodiment, selectors 92 and 94 each can provide either Vreset on both outputs or Vhigh on one output and Vlow on the other output. A timing sequence for this second embodiment is shown in FIG. 4. In this sequence, Xdrive and Ydrive are each at Vreset for one half of each cycle, then at Vhigh for a quarter cycle, and then at Vlow for a quarter cycle. Ydrive is 180 degrees out of phase from Xdrive.

At the beginning of a cycle, with Xdrive high and Ydrive at Vreset, a reset pulse is applied to reset switch 74. By closing SWx1 for a period before drive goes low and SWx2 for a period after Xdrive goes low, a voltage is obtained at the output of X-axis demodulator 78 that is proportional to the displacement of mass 20 along the X-axis.

Halfway through the cycle, after Xdrive is at Vreset and Ydrive is high, another reset pulse is applied to reset switch 74. By closing SWy1 for a period before Ydrive goes low and SWy2 for a period after Ydrive goes low, a voltage is obtained at the output of Y-axis demodulator 80 that is proportional to the displacement of mass 20 along the Y-axis.

With either embodiment, the cycling must be sufficiently faster than the highest frequency to which the mass responds, so that the mass does not move before the measurements are completed. In a preferred embodiment, the mass generally is not responsive to frequencies greater than 10 kilohertz and the cycling is performed at 100 kilohertz or more.

Preferably, all of the components shown in FIG. 1 are located on a single integrated circuit. However, any group of the components, such as demodulators 78 and 80 and timer 90, could be located on one or more separate chips.

Figure 2:
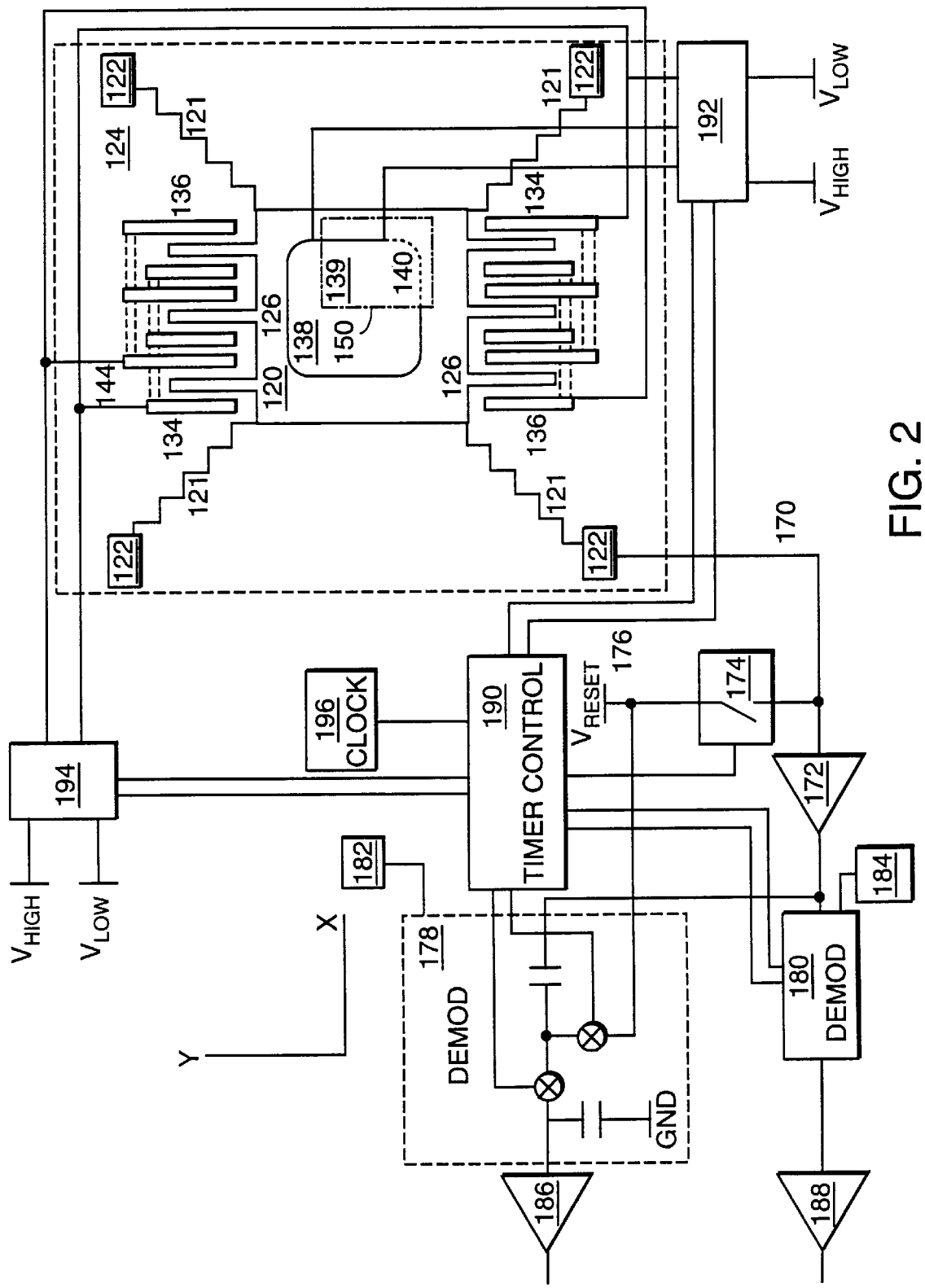
FIG. 2 is a partial block, partial schematic diagram of a second embodiment of the present invention.

An alternative structure for the multi-axis sensing apparatus of the present invention is shown in FIG. 2. In this embodiment, the device is sensitive to rotation about the Z-axis or acceleration along the Z-axis.

Polysilicon mass 120 is suspended above substrate 124 by four serpentine-shaped suspension arms 121 and four anchors 122, so that it is movable along and rotatable about the Z-axis. Fingers 126 extend from opposite sides of mass 120 along the Y-axis. Alternatively, additional fingers 126 could extend along the X-axis.

Polysilicon fingers 134 extend parallel to each finger 126. On one side of mass 120, fingers 134 are to the left of each finger 126. On the opposite side of mass 120, fingers 134 are to the right of each finger 126. Polysilicon fingers 136 extend parallel to and to the other side of each finger 126 from the corresponding finger 134. Thus, clockwise rotation of mass 120 about the Z-axis brings each finger 126 of mass 120 closer to an adjacent finger 136 and further from an adjacent finger 134. Fingers 134 are all electrically connected, and fingers 136 are all electrically connected.

Polysilicon plate 138 extends parallel to and above (along the Z-axis) mass 120. Polysilicon plate 140 (shown with dashed lines within cutaway area 139) extends on the substrate below mass 120.

Fingers 134 and 136, and plates 138 and 140 are all stationary relative to substrate 124. Although, for clarity, only three sets of fingers are shown on the sides of mass 120, in a preferred embodiment twenty or more sets of fingers would be employed on each side.

Fingers 126, 134, and 136 form the electrodes of differential capacitor 144, so that fingers 126 on mass 120 form the common electrode of differential capacitor 144. Similarly, mass 120, plate 138, and plate 140 form the electrodes of differential capacitor 150, in which mass 120 again is the common electrode.

The other components (shown by line 170, amplifier 172, switch 174, reset voltage 176, demodulators 178 and 180, offset inputs 182 and 184, buffer amplifiers 186 and 188, timer 190, selectors 192 and 194, and clock 196) operate like the corresponding components discussed above with respect to FIG. 1. However, the output of demodulator 178 measures the displacement (and the acceleration) along the Z-axis, and the output of demodulator 180 measures the rotation about the Z-axis.

Through the appropriate placement of the fixed electrodes, the apparatus described above can detect and measure forces along and/or about any axis or combination of axes. Moreover, although specific sequences have been described, the voltages on the fixed electrodes can be switched, the reset can be actuated, and the voltage on the mass can be received by the demodulators in any manner that permits two measurements for each axis of interest. More generally, the circuit described above can be used with other sets of two or more differential capacitors, where the common electrodes of each differential capacitor are electrically coupled.

While there have been shown and described examples of the present invention, it will be readily apparent to those skilled in the art that various changes and modifications may be made therein without departing from the scope of the invention as defined by the appended claims. Accordingly, the invention is limited only by the following claims and equivalents thereto.

I claim:

1. A sensing device comprising:
   a micromachined sensor having a movable mass, first and second fixed electrodes of a first differential capacitor, and first and second fixed electrodes of a second differential capacitor, wherein the mass includes a third electrode of the first differential capacitor and a third electrode of the second differential capacitor, and the third electrode of the first differential capacitor is electrically connected to the third electrode of the second differential capacitor;
   an amplifier having an input electrically coupled to the third electrode of the first differential capacitor and the third electrode of the second differential capacitor;
   a first demodulator having an input electrically coupled to an output of the amplifier;
   a second demodulator having an input electrically coupled to the output of the amplifier; and
   a control timer electrically coupled to the first demodulator and the second demodulator.

2. The device according to claim 1, further comprising a first selector having a first output coupled to the first fixed electrode of the first differential capacitor and a second output coupled to the second fixed electrode of the first differential capacitor, and a second selector having a first output coupled to the first fixed electrode of the second differential capacitor and a second output coupled to the second fixed electrode of the second differential capacitor; and wherein the control timer is electrically coupled to a control input of the first selector and a control input of the second selector.

3. The device according to claim 2, further comprising a reset switch having a first port electrically coupled to the third electrode of the first differential capacitor and the third electrode of the second differential capacitor, and a control input electrically coupled to the control timer.

4. The device according to claim 3, wherein the reset switch includes a second port and further comprising means for coupling the second port of the reset switch to a fixed voltage level.

5. The device according to claim 3, wherein the first differential capacitor is responsive to a force in a first orientation and the second differential capacitor is responsive to a force in a second orientation.

6. The device according to claim 5, wherein the first orientation is along a first axis of the movable mass.

7. The device according to claim 6, wherein the second orientation is about one of the first axis or a second axis of the movable mass.

8. The device according to claim 5, wherein the second orientation is along a second axis of the movable mass.

9. The device according to claim 5, wherein the first orientation is about a first axis of the movable mass.

10. The device according to claim 9, wherein the second orientation is about a second axis of the movable mass.

11. The device according to claim 3, wherein the sensor, the amplifier, the reset switch, the first demodulator, the second demodulator, the control timer, the first selector, and the second selector, are on a single integrated circuit.

12. The device according to claim 3, wherein the first demodulator further has an offset input.

13. The device according to claim 12, wherein the second demodulator further has an offset input.

14. The device according to claim 3, wherein the first demodulator is a discrete time demodulator.

15. The device according to claim 14, wherein the second demodulator is a discrete time demodulator.

16. The device according to claim 3, further comprising a first buffer amplifier having an input electrically coupled to an output of the first demodulator.

17. The device according to claim 16, further comprising a second buffer amplifier having an input electrically coupled to an output of the second demodulator.

18. The device according to claim 16, wherein the first buffer amplifier is adjustable.

19. A circuit for measuring change in capacitance comprising:

a first differential capacitor having a first electrode, a second electrode, and a third electrode, with the first electrode forming a first capacitor of the first differential capacitor with the second electrode, and the first electrode forming a second capacitor of the first differential capacitor with the third electrode;

a second differential capacitor having a first electrode, a second electrode, and a third electrode, with the first electrode forming a first capacitor of the second differential capacitor with the second electrode, and the first electrode forming a second capacitor of the second differential capacitor with the third electrode, and wherein the first electrode of the first differential capacitor is coupled to the first electrode of the second differential capacitor;

an amplifier having an input coupled to the first electrode of the first differential capacitor and the first electrode of the second differential capacitor;

a first demodulator having an input coupled to an output of the amplifier;

a second demodulator having an input coupled to the output of the amplifier; and a control timer coupled to the first demodulator and the second demodulator.

20. The circuit according to claim 19, further comprising a reset switch having a first port coupled to the first electrode of the first differential capacitor and to the first electrode of the second differential capacitor, and a control input electrically coupled to the control timer.

21. The circuit according to claim 20, further comprising a first selector having a first output coupled to the second electrode of the first differential capacitor, a second output coupled to the third electrode of the first differential capacitor, and a control input coupled to the control timer; and a second selector having a first output coupled to the second electrode of the second differential capacitor, a second output coupled to the third electrode of the second differential capacitor, and a control input coupled to the control timer.

22. A sensing device comprising:

a movable mass having a first and a second electrode;

a first set of fixed electrodes arranged relative to the first movable mass electrode to form a first differential capacitor;

a second set of fixed electrodes arranged relative to the second movable mass electrode to form a second differential capacitor;

a sensing circuit coupled to the movable mass to detect a change in capacitance of the first differential capacitor during a first time period and a change in capacitance of the second differential capacitance during a second time period; and wherein the first and second differential capacitors are arranged relative to one another to respond to different force components.

23. The device of claim 22 wherein the first and second time periods are non-overlapping.

24. The device of claim 23 wherein the sensing circuit detects a first force component during the first time period and a second force component during a second time period.

25. A sensing device comprising:

a first capacitive structure arranged to change capacitive values in response to a first force component;

a second capacitive structure arranged to change capacitive values in response to a second force component;

an activation and detection circuit for charging the first capacitive structure and detecting a capacitance value in a first time period and for charging the second capacitive structure and detecting a capacitance value in a second time period that does not overlap with the first period.

26. The device of claim 25 wherein the first and second capacitive structures share a common electrode.

27. The device of claim 26 wherein the activation and detection circuit is coupled to the common electrode and activates that electrode to attain a predetermined voltage at a time in between the first and second time periods.

* * * * *